(12) United States Patent
Robinson

(10) Patent No.: US 10,411,440 B1
(45) Date of Patent: Sep. 10, 2019

(54) RETROFITTABLE PANEL BOARD FOR ELECTRIC APPARATUS

(71) Applicant: Siemens Industry, Inc., Alpharetta, GA (US)

(72) Inventor: Kristopher Scott Robinson, Atlanta, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 16/105,032

(22) Filed: Aug. 20, 2018

(51) Int. Cl.
*H02B 1/056* (2006.01)
*H02B 1/06* (2006.01)

(52) U.S. Cl.
CPC .......... *H02B 1/056* (2013.01); *H02B 1/0565* (2013.01); *H02B 1/06* (2013.01)

(58) Field of Classification Search
CPC ...................................... H02B 1/056
See application file for complete search history.

(56) References Cited

U.S. PATENT DOCUMENTS

| | | | | |
|---|---|---|---|---|
| 3,192,446 A | * | 6/1965 | Meacham | H02B 1/056 361/634 |
| 3,349,292 A | * | 10/1967 | Meacham | H02B 1/056 361/624 |
| 3,382,416 A | * | 5/1968 | Jacobs | F16B 5/0233 361/645 |
| 4,162,517 A | * | 7/1979 | Reed | H02B 1/42 361/641 |
| 4,472,761 A | * | 9/1984 | Koslosky | H02B 1/21 361/638 |
| 7,209,343 B2 | | 4/2007 | Remmert et al. | |
| 7,911,768 B2 | * | 3/2011 | Ignasiak | H02B 1/28 200/302.1 |
| 8,027,154 B2 | | 9/2011 | Gatti et al. | |
| 8,717,743 B2 | | 5/2014 | Cortes Rico et al. | |
| 8,885,328 B1 | * | 11/2014 | Czarnecki | H02B 1/42 361/641 |

* cited by examiner

*Primary Examiner* — Robert J Hoffberg

(57) ABSTRACT

A retrofittable panel board (8) for an electric apparatus is provided. A bracket assembly (10) is affixed to a backwall (1004) of an enclosure (1002) of the panel board. Bracket assembly (10) includes guide tracks (12) defining restraint locations (14) to provide an adjustable height. A mount assembly (50), providing mounting support to an interior assembly (13) and in turn to circuit breakers 18, is movable by way of the guide tracks with respect to the bracket assembly. An affixing element (16) is disposed in each guide track and connected to the mount assembly. When loosened, affixing element 16 may be arranged to travel connected with the mount assembly along the guide track to a desired restraint location. When tightened, affixing element 16 may be arranged to fixedly secure the mount assembly to the bracket assembly at the desired restraint location to provide a desired height position to the mount assembly with respect to the backwall of the enclosure.

20 Claims, 5 Drawing Sheets

RETROFITTABLE PANEL BOARD FOR ELECTRIC APPARATUS

BACKGROUND

1. Field

Disclosed embodiments are generally related to panel boards or enclosures for electric apparatuses, and, more particularly, to a retrofittable panel board.

2. Description of the Related Art

Circuit breakers for branch circuits at sites served by an electric power distribution system are typically housed in a panel board, control center or load center, with the first two designations commonly used for units designed to meet the more demanding service requirements of industrial and commercial installations while the latter term is commonly used for residential and relatively light commercial applications. As the main difference between panel boards, control panels and load centers is the service rating, for the sake of simplicity of description, just the term "panel board" will be used throughout the present disclosure, but it should be understood that the term "panel board" will also encompass control panels and load centers, unless otherwise stated.

Often it is desirable to replace or update the electrical functionality provided by equipment (e.g., interior assembly and circuit breakers) in a panel board already in use at a given site. The enclosure of the panel board is usually still quite adequate in quality, and, in the case of recessed panel board enclosures, installing a new panel board enclosure would involve wall repairs to remove and replace the existing panel board enclosure. Thus, replacing the existing panel board enclosure with a new panel board enclosure may turn into a costly and burdensome operation. U.S. Pat. No. 7,209,343 describes an adjustable riser assembly for retrofitting an existing panel board enclosure.

DETAILED DESCRIPTION

Figure 1:
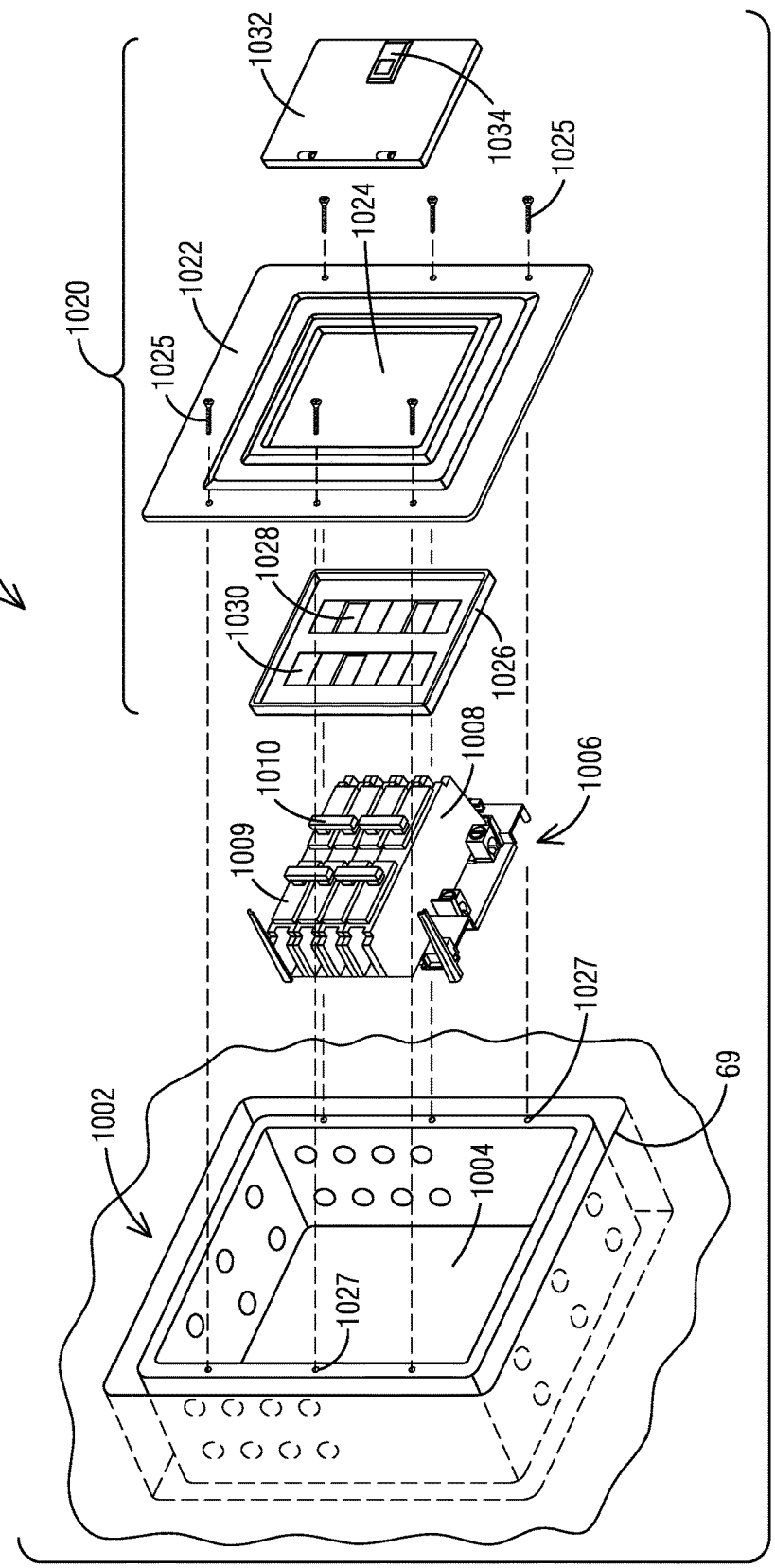
FIG. 1 is an exploded view of a prior art panel board that can benefit from disclosed embodiments.

The inventor of the present invention has recognized certain issues that can arise when retrofitting certain prior art electrical panel boards or enclosures, such as described below with reference to FIG. 1. A typical panel board 1000 includes an enclosure 1002 having a backwall 1004 and four side walls. Mounted within the enclosure is a structure typically referred to as an interior assembly 1006 for mounting one or more circuit breakers 1008, as may include respective manually-actuated levers 1010 extending from a face 1009 of respective circuit breakers. As will be appreciated by one skilled in the art, interior assembly 1006 typically includes bus bars electrically insulated by a supporting insulating structure and terminal blocks to which electrical conductors are connected.

Panel board 1000 may also include a cover assembly 1020 (also referred to as a trim assembly) that may include a cover plate (e.g., trim) 1022 that may be attached (at a fixed location) to enclosure 1002 by way of threaded fasteners 1025 inserted into threaded holes 1027 located in respective front edges of enclosure 1002. Cover plate 1022 may define a window like opening 1024 and may include a dead front plate 1026 that may be configured to provide one or more access openings 1028 arranged to register with each respective face 1009 of installed circuit breakers 1008 and respective manually-actuated levers 1010. Removable plates 1030, commonly referred to as knock-outs or twist-outs, may be provided as part of dead front plate 1026 to arrange quantity and location of the one or more access openings 1028 that may be involved in a given application. A hinged door 1032 with a latch 1034 may be connected to cover plate 1022 to cover dead front plate 1026 when in the closed position.

In replacing or updating electrical functionality provided by equipment originally installed in a panel board, it has been found that in many cases the replacement equipment providing the same or expanded electrical functionality may not physically match the originally installed equipment. Consequently, the access openings 1028 in dead front plate 1026 may no longer register (e.g., be flush) with the manually-actuated levers on the respective faces of the replacement circuit breakers. As noted above, the existing enclosure of the panel board is usually still quite adequate in quality. Thus, replacing the existing enclosure of the panel board with a new panel board enclosure may not be desirable in view of the cost of the new board plus concomitant expenses, such as involving wall repair.

In the prior art, retrofitting an existing panelboard with a replacement interior assembly and replacement circuit breakers has involved shimming up the replacement interior assembly or fabricating risers to, for example, bring the replacement (e.g., physically smaller) circuit breakers into registry with the dead front access openings. This latter practice may require the contractor to supply measurements of the existing enclosure, which are often not accurate and/or not timely provided. The approach described in U.S. Pat. No. 7,209,343 is believed to involve cumbersome and time-consuming alignment of rows of holes and removal and insertion of fasteners into the aligned rows of holes.

In view of such recognition, the present inventor proposes innovative retrofitting assemblies (e.g., a kit) effective to provide, in a user-friendly manner, a reliable and relatively low-cost technical solution to solve at least the issues mentioned above in connection with the retrofit of an existing electric panel board.

In the following detailed description, various specific details are set forth in order to provide a thorough understanding of such embodiments. However, those skilled in the art will understand that disclosed embodiments may be practiced without these specific details that the aspects of the present invention are not limited to the disclosed embodiments, and that aspects of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

The terms "comprising", "including", "having", and the like, as used in the present application, are intended to be synonymous unless otherwise indicated. Lastly, as used herein, the phrases "configured to" or "arranged to" embrace the concept that the feature preceding the phrases "configured to" or "arranged to" is intentionally and specifically designed or made to act or function in a specific way and should not be construed to mean that the feature just has a capability or suitability to act or function in the specified way, unless so indicated.

Figure 2:
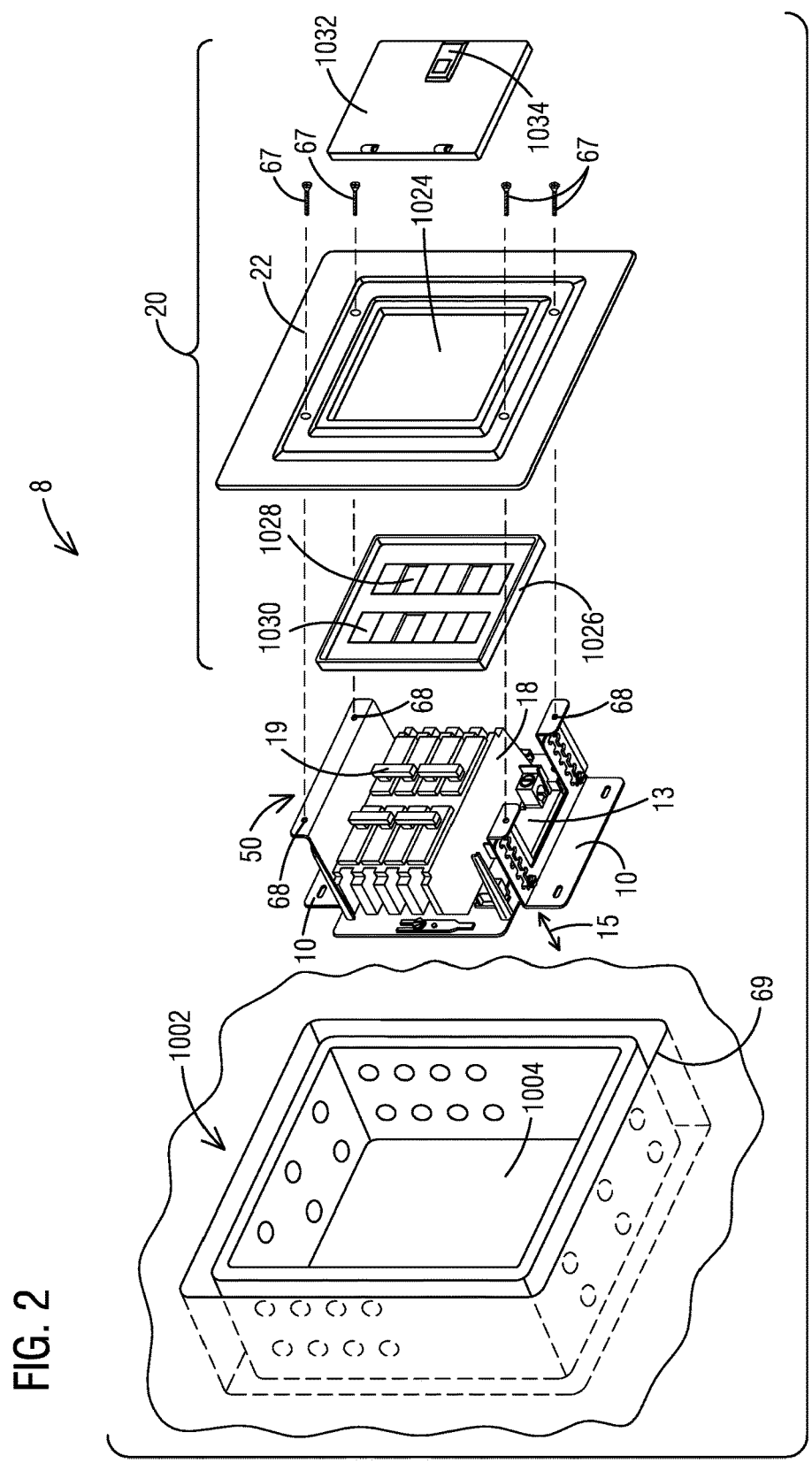
FIG. 2 is an exploded view of a disclosed retrofittable panel board including respective non-limiting embodiments of a mount assembly, bracket assembly and cover assembly that may be used in the retrofittable panel board.

FIG. 2 is an exploded view of a disclosed retrofittable panel board 8 including respective embodiments of a bracket assembly 10, a mount assembly 50 and a cover assembly 20 that may be used for retrofitting the panel board to accommodate a replacement interior assembly 13 and replacement circuit breakers 18. Bracket assembly 10 may be affixed to backwall 1004 of enclosure 1002 of panel board 8. Without limitation, as may be better appreciated in FIG. 5, bracket assembly 10 may include a plurality of guide tracks 12', 12", 12''', 12''''. Each guide track 12 defines a plurality of restraint locations 14 arranged to provide an adjustable height with respect to the backwall of the enclosure. It will be appreciated that restraint locations 14 may alternatively be functionally described as providing an adjustable depth with respect to the front of the enclosure.

Mount assembly 50 is movable (schematically represented by twin-headed arrows 15 in FIGS. 2 and 4) by way of the plurality of guide tracks 12 with respect to bracket assembly 10. A respective affixing element 16 (FIGS. 4 and 5), such as without limitation, a threaded affixing element, may be disposed in each respective one of the plurality of guide tracks and connected to the mount assembly in a loosened condition or in a tightened condition. When in the loosened condition, each respective affixing element 16 may be arranged to travel connected with mount assembly 50 along the respective one of the plurality of guide tracks 12 to a desired restraint location of the plurality of restraint locations 14.

When in the tightened condition, each respective affixing element 16 may be arranged to fixedly secure mount assembly 50 with respect to bracket assembly 10 at the desired restraint location of the plurality of restraint locations 14. The desired restraint location of the plurality of restraint locations provides a desired height position to mount assembly 50 with respect to the backwall 1004 of enclosure 1002.

Figure 3:
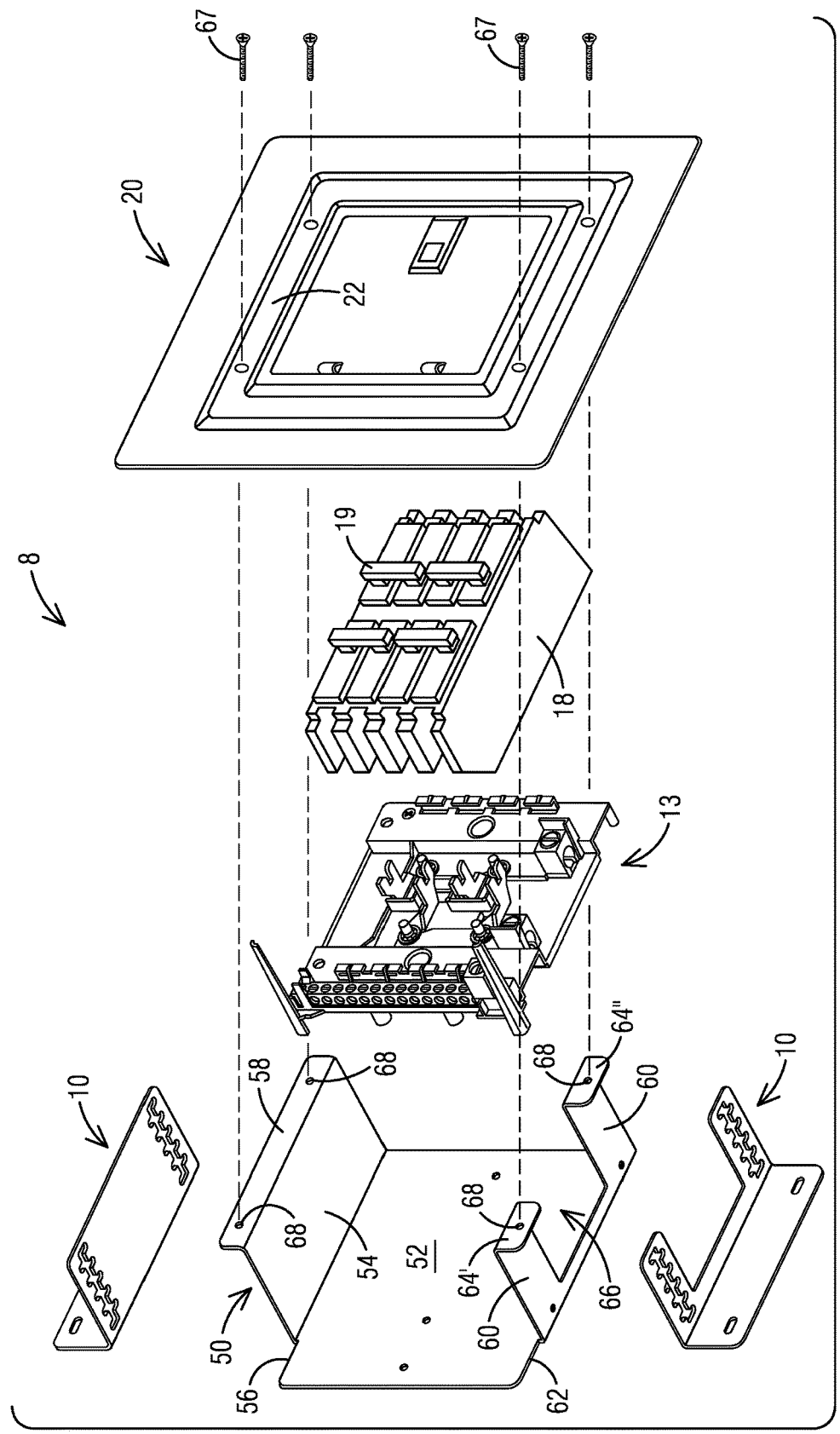
FIG. 3 is an exploded view of a disclosed unassembled components (e.g., a kit) for retrofitting a panel board.

As may be appreciated in FIG. 3, mount assembly 50 includes a base pan 52 configured to support interior assembly 13. In one non-limiting embodiment, mount assembly 50 includes an end wall 54 (also seen in FIG. 4) arranged to extend away opposite the backwall 1004 of the enclosure 1002 of panel board 8. End wall 54 may extend from a distal edge 56 of base pan 52 at a right angle with respect to base pan 52. In one non-limiting embodiment, end wall 54 includes a flange 58 extending outwardly from end wall 54 and parallel with respect to base pan 52.

In one non-limiting embodiment, mount assembly 50 further includes two spaced-apart mount assembly members 60 arranged to extend away opposite the backwall 1004 of the enclosure 1002 of panel board 8. Spaced-apart mount assembly members 60 may extend from a proximate edge 62 of base pan 52 at a right angle with respect to base pan 52. Proximate edge 62 of base pan 52 is opposed to distal edge 56 of base pan 52.

In one non-limiting embodiment, spaced-apart mount assembly members 60 each includes a respective flange 64', 64" extending outwardly from each of the two spaced-apart mount assembly members 60 and parallel with respect to base pan 52. Flange 58, extending outwardly from end wall 54, and the respective flanges 64', 64" extending outwardly from each of the two spaced-apart mount assembly members 60, are coplanar with one another. The two spaced-apart mount assembly members 60 define an opening 66 arranged to provide access to interior assembly 13 (e.g., a front region of interior assembly 13).

Figure 4:
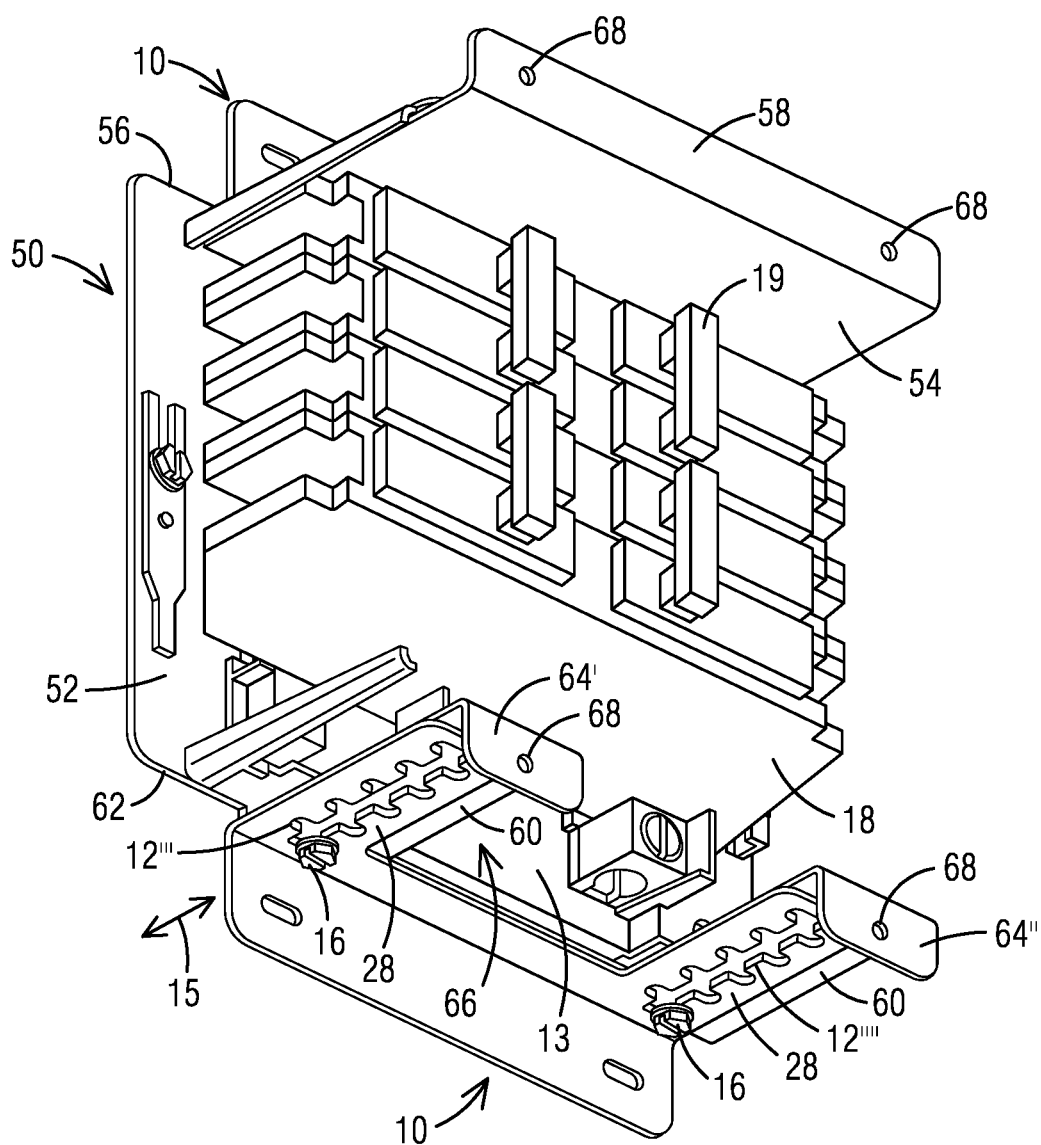
FIG. 4 is an isometric view of assembled components of the kit shown in FIG. 3.

In one non-limiting embodiment bracket assembly 10 includes an end bracket piece 26 (FIG. 5) disposed in abutting relationship and in correspondence with end wall 54 of mount assembly 50. In FIG. 4, end bracket piece 26 is behind end wall 54 of mount assembly 50 and therefore is not visible. As can be appreciated in FIG. 5, end bracket piece 26 includes a first guide track 12' and a second guide track 12" of the plurality of guide tracks 12. The first and second guide tracks 12', 12" may be disposed at mutually opposed sides of end bracket piece 26.

In one non-limiting embodiment bracket assembly 10 further includes two spaced apart bracket assembly members 28 disposed in abutting relationship and in correspondence with the two spaced-apart mount assembly members 60. The two spaced apart bracket assembly members 28 may each respectively include a third guide track 12''' and a fourth guide track 12'''' of the plurality of guide tracks 12. The third guide track 12''' and the fourth guide track 12'''' are respectively aligned with the first 12' and second guide tracks 12".

Figure 5:
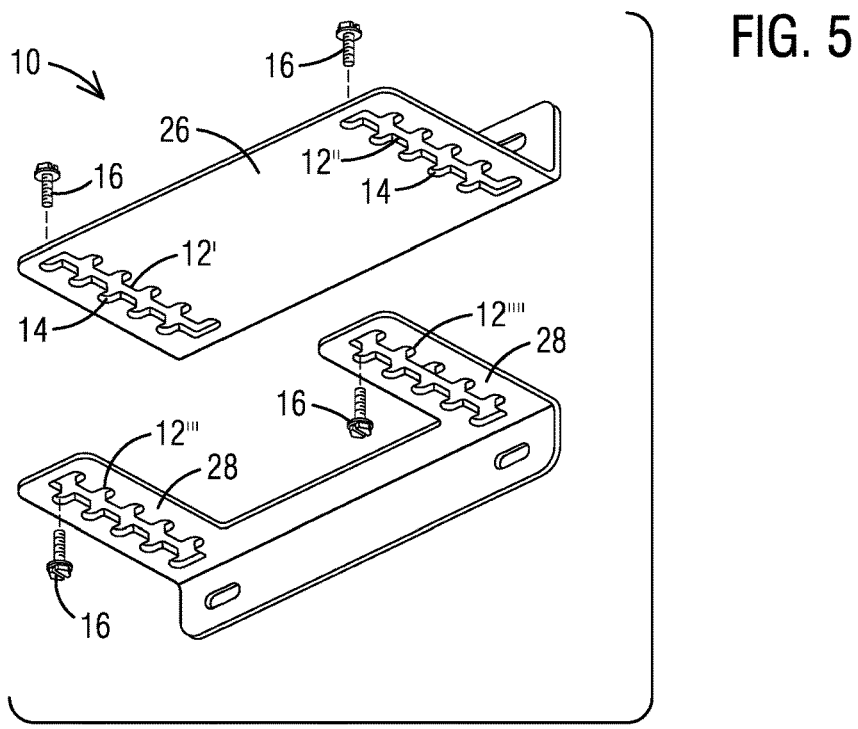
FIG. 5 is an isometric view showing structural details of one non-limiting embodiment of a disclosed bracket assembly.

As can be further appreciated in FIG. 5, the respective plurality of restraint locations 14 may be arranged at mutually opposed edges of guide tracks 12. Without limitation, a respective one of the mutually opposed edges of the plurality of guide tracks 12 may be arranged to provide a first set of height locations with respect to the backwall of the enclosure. Conversely, the other one of the mutually opposed edges of the plurality of guide tracks may be arranged to provide a second set of height locations with respect to the backwall of the enclosure. In one non-limiting embodiment, the first and second set of height locations may be arranged to provide different height locations relative to one another.

Figure 6:
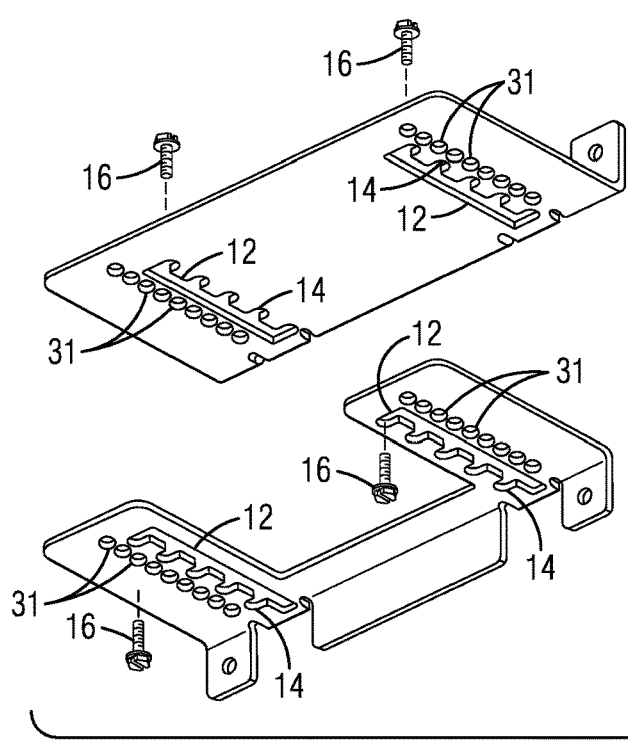
FIG. 6 is an isometric view showing structural details of another non-limiting embodiment of a disclosed bracket assembly.

As can be further appreciated in FIG. 6, the respective plurality of restraint locations 14 need not be arranged at mutually opposed edges of guide tracks 12. For example, the restraint locations 14 could be arranged just on one edge of guide tracks 12. Also, in lieu of guide tracks, a plurality of discrete holes 31 could be used in the bracket assembly to provide variable height locations with respect to the backwall of the enclosure.

In one non-limiting embodiment, as may be conceptualized from the view shown in FIG. 2 and the foregoing description, the desired height position of mount assembly 50 with respect to the backwall 1004 of the enclosure 1002 of panel board 8 can be chosen so that when circuit breakers 18 are assembled in retrofittable panel board 8, respective manually-actuated levers 19 of circuit breakers 18 are in registration with circuit breaker access openings 1028.

In one non-limiting embodiment, as may be appreciated in FIG. 3, a retrofit cover plate 22 of cover assembly 20 may be connected by way of respective threaded fasteners 67 insertable into threaded holes 68 in the respective co-planar flanges 58, 64', 64". Without limitation, the height of co-planar flanges 58, 64', 64" may be chosen so that when mount assembly 50 is at the desired height position with respect to the backwall 1004 of enclosure 1002, the respective front edges of cover assembly 20 are flush with respective edges 69 (FIG. 2) of a wall that define a recess where panel board 8 is installed.

In operation, disclosed kit assemblies are effective to provide, in a user-friendly manner, a reliable and relatively low-cost technical solution to solve at least the issues mentioned above in connection with the retrofit of an existing electrical panel board. Without limitation, disclosed kit assemblies avoid or reduce the possibility of having to install a new panel board enclosure and thus save costs that otherwise would be involved in wall repairs to remove and replace the existing panel board enclosure. Additionally, disclosed kit assemblies avoid cumbersome and time-consuming operations involved in certain prior art techniques, such as may involve alignment of rows of holes in a riser assembly and removal and insertion of fasteners into the aligned rows of holes in the riser assembly.

While embodiments of the present disclosure have been disclosed in exemplary forms, it will be apparent to those skilled in the art that many modifications, additions, and deletions can be made therein without departing from the scope of the invention and its equivalents, as set forth in the following claims.

What is claimed is:

1. A retrofittable panel board for an electric apparatus, the retrofittable panel board comprising:
a bracket assembly affixed to a backwall of an enclosure of the retrofittable panel board, the bracket assembly including a plurality of guide tracks, each of the guide tracks defining a plurality of restraint locations arranged to provide an adjustable height with respect to the backwall of the enclosure;
a mount assembly movable by way of the plurality of guide tracks with respect to the bracket assembly; and
a respective affixing element disposed in each of a respective one of the plurality of guide tracks and connected to the mount assembly in a loosened condition or in a tightened condition,
the respective affixing element, when in the loosened condition, arranged to travel connected with the mount assembly along the respective one of the plurality of guide tracks to a desired restraint location of the plurality of restraint locations,
the respective affixing element, when in the tightened condition, arranged to fixedly secure the mount assembly with respect to the bracket assembly at the desired restraint location of the plurality of restraint locations, the desired restraint location of the plurality of restraint locations providing a desired height position to the mount assembly with respect to the backwall of the enclosure.

2. The retrofittable panel board of claim 1, wherein the mount assembly includes a base pan to support an interior assembly.

3. The retrofittable panel board of claim 2, further comprising circuit breakers mounted on the interior assembly.

4. The retrofittable panel board of claim 3, further comprising a cover assembly including circuit breaker access openings, wherein the desired height position of the mount assembly with respect to the backwall of the enclosure is chosen to position respective manually-actuated levers of the circuit breakers in registration with tho circuit breaker access openings.

5. The retrofittable panel board of claim 2, wherein the mount assembly includes an end wall arranged to extend away opposite the backwall of the enclosure of the retrofittable panel board, the end wall extending from a distal edge of the base pan at a right angle with respect to the base pan.

6. The retrofittable panel board of claim 5, wherein the end wall includes a first flange extending outwardly from the end wall and parallel with respect to the base pan.

7. The retrofittable panel board of claim 6, wherein the mount assembly includes two spaced-apart mount assembly members arranged to extend away opposite the backwall of the enclosure of the retrofittable panel board, the two spaced-apart mount assembly members extending from a proximate edge of the base pan at a right angle with respect to the base pan, the proximate edge of the base pan opposed to the distal edge of the base pan.

8. The retrofittable panel board of claim 7, wherein the two spaced-apart mount assembly members each includes a respective second flange extending outwardly from each of the two spaced-apart mount assembly members and parallel with respect to the base pan, wherein the first flange and each second respective flange are coplanar.

9. The retrofittable panel board of claim 7, wherein the two spaced-apart mount assembly members define an opening arranged to provide access to the interior assembly.

10. The retrofittable panel board of claim 7, wherein the bracket assembly includes an end bracket piece disposed in abutting relationship and in correspondence with the end wall of the mount assembly, the end bracket piece including a first guide track and a second guide track of the plurality of guide tracks, the first and second guide tracks disposed at mutually opposed sides of the end bracket piece.

11. The retrofittable panel board of claim 10, wherein the bracket assembly further includes two spaced apart bracket assembly members disposed in abutting relationship and in correspondence with the two spaced-apart mount assembly members, the two spaced apart bracket assembly members respectively including a third guide track and a fourth guide track of the plurality of guide tracks, wherein the third guide track and the fourth guide track are respectively aligned with the first and second guide tracks.

12. The retrofittable panel board of claim 8, further comprising a cover assembly connected by way of respective threaded fasteners to the first flange and each respective second flanges that are co-planar, wherein a height of the coplanar flanges with respect to the backwall of the enclosure is chosen so that respective edges of the cover assembly are flush with respective edges of a wall that define a recess where the retrofittable panel board is installed.

13. The retrofittable panel board of claim 1, wherein the respective one of the plurality of guide tracks includes a respective one of the plurality of restraint locations at mutually opposed edges of the respective one of the plurality of guide tracks.

14. The retrofittable panel board of claim 13, wherein the respective plurality of restraint locations at a respective one of the mutually opposed edges of the respective one of the plurality of guide tracks is arranged to provide a first set of height locations with respect to the backwall of the enclosure.

15. The retrofittable panel board of claim 14, wherein the respective plurality of restraint locations at another one of the mutually opposed edges of the respective one of the plurality of guide tracks is arranged to provide a second set of height locations with respect to the backwall of the enclosure, wherein the first and second set of height locations comprise different height locations relative to one another.

16. Tire retrofittable panel board of claim 1, wherein the respective affixing element comprises a threaded affixing element.

17. A retrofittable panel board for an electric apparatus, the retrofittable panel board comprising:
  a bracket assembly affixed to a backwall of an enclosure of the retrofittable panel board, the bracket assembly including a plurality of guide tracks, each of the guide tracks defining a plurality of restraint locations arranged to provide an adjustable height with respect to the backwall of the enclosure;
  a mount assembly movable by way of the plurality of guide tracks with respect to the bracket assembly, wherein the mount assembly includes a base pan;
  an interior assembly supported by the base pan;
  circuit breakers mounted on the interior assembly;
  a respective affixing element disposed in each of a respective one of the plurality of guide tracks and connected to the mount assembly in a loosened condition or a tightened condition,
  the respective affixing element, when in the loosened condition, arranged to travel connected with the mount assembly along the respective one of the plurality of guide tracks to a desired restraint location of the plurality of restraint locations,
  the respective affixing element, when in the tightened condition, arranged to fixedly secure the mount assembly with respect to the bracket assembly at the desired restraint location of the plurality of restraint locations, the desired restraint location of the plurality of restraint locations providing a desired height to the mount assembly with respect to the backwall of the enclosure; and
  a cover assembly including circuit breaker access openings, wherein the desired height position of the mount assembly with respect to the backwall of the enclosure is chosen to position respective manually-actuated levers of the circuit breakers in registration with the circuit breaker access openings.

18. The rotiofittable panel board of claim 17, wherein the mount assembly includes an end wall arranged to extend away opposite the backwall of the enclosure of the retrofittable panel board, the end wall extending from a distal edge of the base pan at a right angle with respect to the base pan, wherein the end wall includes a first flange extending outwardly from the end wall and parallel with respect to the base pan.

19. The retrofittable panel board of claim 18, wherein the mount assembly includes two spaced-apart mount assembly members arranged to extend away opposite the backwall of the enclosure of the retrofittable panel board, the two spaced-apart mount assembly members extending from a proximate edge of the base pan at a right angle with respect to the base pan, the proximate edge of the base pan opposed to the distal edge of the base pan,
  wherein the two spaced-apart mount assembly members each includes a respective second flange extending outwardly from each of the two spaced-apart mount assembly members and parallel with respect to the base pan,
  wherein the first flange and each respective second flange are coplanar.

20. The retrofittable panel board of claim 19, wherein the cover assembly is connected by way of respective threaded fasteners to the first flange and each respective second flange are co-planar, wherein a height of the coplanar flanges with respect to the backwall of the enclosure is chosen so that respective edges of the cover assembly are flush with respective edges of a wall that define a recess where the retrofittable panel board is installed.

\* \* \* \* \*